United States Patent [19]

Combroux

[11] 4,396,592
[45] Aug. 2, 1983

[54] PLURAL ZONE PROCESS FOR THE PREPARATION OF CHLORINE DIOXIDE

[75] Inventor: Jean Combroux, Mornant, France

[73] Assignee: Produits Chimiques Ugine Kuhlmann, Paris, France

[21] Appl. No.: 338,326

[22] Filed: Jan. 11, 1982

[30] Foreign Application Priority Data

Jan. 27, 1981 [FR] France .................. 81 01462

[51] Int. Cl.³ .................................................. C01B 11/02
[52] U.S. Cl. ................................................................ 423/478
[58] Field of Search .................... 423/478, 477; 5/451

[56] References Cited

U.S. PATENT DOCUMENTS

| | | | |
|---|---|---|---|
| 2,484,402 | 10/1949 | Day | 423/478 |
| 2,664,341 | 12/1953 | Kesting | 423/478 |
| 4,234,446 | 11/1980 | Ramras | 423/477 |

FOREIGN PATENT DOCUMENTS

| | | | |
|---|---|---|---|
| 831542 | 1/1952 | Fed. Rep. of Germany | 423/478 |
| 924689 | 3/1955 | Fed. Rep. of Germany | 423/478 |
| 6906359 | 7/1970 | Netherlands | 423/478 |

OTHER PUBLICATIONS

Foerst, Ed., *Ullmanns Encyklopadie der technischen Chemie* 3rd Ed., vol. 5, Urban, Munchen, W. Germany pp. 552, 553.

*Primary Examiner*—Brian E. Hearn
*Attorney, Agent, or Firm*—Brooks, Haidt, Haffner & Delahunty

[57] ABSTRACT

A process for the production of chlorine dioxide by the reaction of an alkali metal chlorate and hydrochloric acid in aqueous solution at temperatures of from about 35° to about 70° C. wherein the chlorate and the hydrochloric acid are introduced into a first reaction zone (the primary reactor) and after a residence time of two to ten minutes the reactants are fed through a system of reaction zones (secondary reactors) filled and emptied in sequence, the temperature of the reaction mixture in each secondary reactor being equal to or at most 15° C. above that in the primary reactor, the residence time in each secondary reactor being from 20 to 40 minutes, the process permitting the use of less expensive reactor materials, such as polyvinyl chloride, with consequent savings in the cost of the reactors so employed.

8 Claims, No Drawings

PLURAL ZONE PROCESS FOR THE PREPARATION OF CHLORINE DIOXIDE

BACKGROUND OF THE INVENTION

The present invention relates to a process for the preparation of chlorine dioxide, and more particularly, it relates to improved commercial processes for the economical preparation of chlorine dioxide.

Chlorine dioxide is quite useful industrially because of its very strong oxidizing properties. The principal areas of use are in the bleaching of paper pulps and of textiles, and in the treatment of water, for which chlorine dioxide permits preparing potable water having good organoleptic properties.

Different means have been employed for forming chlorine dioxide. In general, the formation of chlorine dioxide utilizes the reduction of an alkali metal chlorate, usually sodium chlorate, in an acid medium. The most usual reducing agents currently employed are sulfur dioxide, hydrogen peroxide and alkali metal chlorides.

In this last case, the basic reaction utilized in such processes can be represented by the following chemical equation:

$$2ClO_3^- + 2Cl^- + 4H^+ \rightarrow 2ClO_2 + Cl_2 + 2H_2O$$

In processes of this type, the acid introduced into the reaction medium is generally sulfuric acid.

The overall reaction thus brought about can be represented by the following equation:

$$2NaClO_3 + 2NaCl + 2H_2SO_4 \rightarrow 2ClO_2 + Cl_2 + 2Na_2SO_4 + 2H_2O$$

Some processes utilizing the foregoing reaction systems are described, for example, in French Pat. Nos. 1,443,755 and 2,003,223, or also by Canadian Pat. Nos. 993,158 and 976,726. It is necessary, according to these prior art processes, to operate in a very acid medium corresponding to acid concentrations, expressed in normality, of some 1 to 12 N. There accordingly arises the formation of an acid effluent comprised by a mixture of sulfuric acid and sodium sulfate in aqueous solution, for which it is very difficult to find a use and which is accordingly discarded after it has been neutralized.

However, it is possible to generate chlorine dioxide starting from an alkali metal chlorate, usually sodium chlorate, by introducing into the reaction medium hydrochloric acid. This acid acts to furnish at the same time the reducing agent and the source of acidity. The reaction brought about in this case where the alkali metal chlorate is sodium chlorate is as follows:

$$2NaClO_3 + 4HCl \rightarrow 2ClO_2 + Cl_2 + 2NaCl + 2H_2O$$

However, when an amount of hydrochloric acid in excess of the stoichiometric quantity for the foregoing reaction is introduced, either locally or throughout the reaction medium, a parallel reaction occurs according to the following chemical equation:

$$NaClO_3 + 6HCl \rightarrow 3Cl_2 + NaCl + 3H_2O$$

In this reaction, there is no formation of chlorine dioxide, but rather only the formation of chlorine.

Some processes utilizing hydrochloric acid acting both to furnish the acid and as the reducing agent have been set forth in various patents. By way of example, such processes relying on the above-indicated reaction system have been described, particularly in French Pat. No. 1,015,040 and in Canadian Pat. Nos. 1,049,950; 956,783; and 956,784.

The disadvantages accruing to these processes arise in the need to use expensive apparatus. This is the case in particular with the process described in French Pat. No. 1,015,040, wherein the equipment for the generation of chlorine dioxide is comprised by six reactors placed in succession and wherein the material of construction must be titanium, a metal resistant to corrosion by the reaction mixture at its boiling temperature. Moreover, the total volume of these six reactors is large. Thus, for the production of chlorine dioxide on the order of one tonne an hour, the reaction volume is about 45 m³.

According to Canadian Pat. Nos. 1,049,950; 956,783; and 956,784, the production of chlorine dioxide can be realized in such apparatus functioning under sub-atmospheric pressures, and their strength must be accordingly increased as a consequence.

THE INVENTION

The present invention provides novel a process for producing chlorine dioxide starting with an alkali metal chlorate and hydrochloric acid in aqueous solution, avoiding the drawbacks of the prior art processes and, particularly the high cost of the reactors involved in such processes.

Briefly, the process of the present invention produces chlorine dioxide by reacting an alkali metal chlorate and hydrogen chloride in an aqueous medium by introducing these reactants into a primary reaction zone at a given temperature, holding the reactants in the primary zone for a period of time, passing the reactants into a system of secondary reaction zones at a temperature equal to or greater than that in the primary zone for further periods of time, and recovering the chlorine dioxide thus formed, the zones being desirably swept with an inert gas to control the reaction.

This present process can be carried out either starting with hydrochloric acid in concentrated aqueous solution, such as exists industrially, or starting with gaseous hydrogen chloride. The reaction of the present invention can be carried out under atmospheric pressure.

The alkali metal chlorate used in the processes of the present invention is desirably sodium chlorate, potassium chlorate, or lithium chlorate. The alkali metal chlorate can be used in the reaction alone or it can be accompanied by the corresponding alkali metal chloride in aqueous solution, such as that obtained by the electrolytic preparation of alkali metal chlorates starting from the corresponding alkali metal chlorides.

In the processes according to the present invention, the two reactants, namely the alkali metal chlorates, alone or accompanied by the corresponding chloride, in aqueous solution and the hydrogen chloride are continuously introduced into the apparatus for generating the chlorine dioxide. The mixture of the two reactants is maintained at a temperature of at least about 35° C. and at most about 70° C. In certain preferred embodiments of the invention, the temperature is maintained at from about 50° to about 65° C.

Simultaneously, an inert gas is introduced into the reaction mixture in order to maintain the chlorine dioxide formed at concentrations below about 17% by volume of the gaseous mixture which is released from the solution. This permits the avoidance of any decomposition of the chlorine dioxide. A variety of inert gases can be used. An inert gas according to the present invention is one which does not have any affinity for the reactants or for the products formed. Examples of desirable gas are air and nitrogen.

In the framework of the present invention and in the temperature range at which the mixture of reactants is maintained, it is possible to use for the material of construction of the chlorine dioxide-producing apparatus some materials which are far less expensive than titanium.

Among the materials which can thus be used for constructing the chlorine dioxide generating apparatus according to the present invention are a variety of materials which are easily worked and relatively inexpensive. An example of such material which can be used for constructing apparatus for the practice of the present processes is polyvinyl chloride.

In the process of the present invention, the reactants, alkali metal chlorates with or without the corresponding chloride and the hydrochloric acid, are introduced in proportions such that the molar ratio of alkali metal chlorate to hydrochloric acid is from about 0.5 to about 3. In certain preferred embodiments, the molar ratio of the chlorate to hydrogen chloride is from about 0.8 to about 2. The initial acidity of the mixture introduced into the generating apparatus is from about 0.5 to about 8 M, and in certain preferred embodiments it is from about 1 to about 4 M.

The chlorine dioxide production apparatus is comprised by a system containing a reaction vessel fed continuously and two or three reactors functioning in sequence. The first reactor, called herein the principal reactor, is continuously fed with the help of the two reactants, the aqueous solution of akali metal chlorate and the hydrochloric acid. In this stage, the residence time of reactants is from about 2 to about 10 minutes, and in certain preferred embodiments the residence time is from about 2.5 to about 7 minutes.

The reaction mixture is held at a constant temperature.

The products in aqueous solution leaving the first reactor are carried through a system of secondary reactors which are filled and emptied sequentially. The temperature of the reaction mixture in these secondary reactors during the filling time and during the course of the reaction is maintained constant. The temperatures in the secondary vessels are equal to or at most 10° to 15° C. greater than that of the primary continuous reactor.

The mixture remains for from 20 to 40 minutes in each secondary reactor. A system of two or three reactors alternately receiving the aqueous solution coming from the first reactor can be used to recover the latter. The whole apparatus comprised by the primary continuous reactor and the secondary reactors functioning in sequence is swept with a current of inert gas designed to dilute the chlorine dioxide formed in order to avoid any decomposition of the latter product.

All parts, percentages, proportions and ratios herein are by weight unless otherwise indicated.

The following Examples are given to illustrate embodiments of the invention as it is presently preferred to practice it. It will be understood that these Examples are illustrative, and the invention is not to be considered as restricted thereto except as indicated in the appended Claims.

EXAMPLE I

An aqueous solution containing 592.8 g/L of sodium chlorate and 74.3 g/L of sodium chloride is continuously introduced at the rate of 46 L/hr into a reactor having a 10-liter volume. Simultaneously, a 405 g/L aqueous hydrochloric acid solution is introduced into the same reactor at the rate of 18 liters/hr. This corresponds to a molar ratio of $NaClO_3/HCl$ equal to 1.28.

The volume of liquid in the reactor at the boil-over point is 5.4 liters. At the same time, a flow of air is introduced through the base of the reactor to dilute the chlorine dioxide. The air is fed at the rate of 15 m$^3$/hr and the temperature of the reaction mixture is maintained at 60° C. The residence time of these reactants in the first reactor is about five minutes.

The aqueous solution leaving this first reactor is successively introduced into one of three reactors, functioning in sequence, during 20 minutes. Each of these three reactors has a 50-liter volume. Their temperature is maintained at 60° C. and they are swept with air at the rate of 12 m$^3$/hr when they hold the reaction mixture. Each of these reactors is constructed of polyvinyl chloride.

At the end of one hour of operation, there is recovered 4.73 kg of chlorine dioxide and 4.33 kg of chlorine. This corresponds to a molar ratio of chlorine dioxide to chlorine of 1.15.

EXAMPLE II

In a system comprised in the same fashion as that in Example I, but with the three reactors each having a volume of 70 liters, an aqueous solution containing 599 g/L of sodium chlorate and 107.8 g/L of sodium chloride is continuously introduced into the first reactor at the rate of 79.9 liters an hour. At the same time, hydrochloric acid containing 407 g/L of hydrogen chloride is introduced into the same reactor at the rate of 45.9 liters/hr and the temperature is maintained at 60° C. The residence time of the reactants in the primary reactor is 2.7 minutes.

In the same fashion, the solution leaving the primary continuous reactor is sequentially fed into one of three reactors during 30 minutes. The temperature in these three reactors is kept at 65° C. The continuous reactor and the three reactors functioning in sequence are swept with air such as set forth in Example I.

At the end of 90 minutes of operation, there is recovered 18.3 kg of chlorine dioxide and 17.2 kg of chlorine. This corresponds to a molar ratio of $ClO_2/Cl_2$ of 1.12.

What is claimed is:

1. A process for the production of chlorine dioxide which comprises introducing an alkali metal chlorate in aqueous solution and hydrogen chloride and an inert gas into a primary reaction zone at a temperature of from about 35° to about 70° C., the proportion of alkali metal chlorate to hydrogen chloride being from about 0.5 to about 3 and the residence time in the primary reaction zone being from about two to about ten minutes; removing the reaction products from the first reaction zone and introducing the products into a system of secondary reaction zones filled and emptied in sequence, the temperature in each of the secondary reaction zones being equal to or at most 15° C. greater than that in the first reaction zone and the residence time in each secondary reaction zone being from about 20 to about 40 minutes.

2. A process according to claim 1 wherein the inert gas is introduced at a rate such that the chlorine dioxide released from the liquid mixture is kept at a concentration of less than about 17 percent by volume of the gas leaving the liquid.

3. A process according to claim 1 wherein the acidity of the initial reaction mixture is from about 0.5 to about 8 M.

4. A process according to claim 1 wherein the inert gas is air or nitrogen.

5. A process according to claim 1 wherein the residence time in the primary reaction zone is from about 2.5 to about 7 minutes.

6. A process according to claim 1 wherein the molar ratio of alkali metal chlorate to hydrogen chloride is from about 0.8 to about 2.

7. A process according to claim 1 wherein the inital acidity is from 1 to 4 M.

8. A process according to claim 1 wherein the aqueous alkali metal chlorate solution contains the corresponding alkali metal chloride.

* * * * *